US010493699B2

(12) United States Patent
Youngblood, Jr. et al.

(10) Patent No.: US 10,493,699 B2
(45) Date of Patent: Dec. 3, 2019

(54) METHOD AND APPARATUS FOR FORMING LEAK DETECTABLE GEOMEMBRANE LINERS

(71) Applicant: GSE Environmental, LLC, Houston, TX (US)

(72) Inventors: Jimmie Gordon Youngblood, Jr., Humble, TX (US); David James Gallagher, Houston, TX (US); Edward Joseph Zimmel, Magnolia, TX (US)

(73) Assignee: GSE Environmental, LLC, Houston, TX (US)

( * ) Notice: Subject to any disclaimer, the term of this patent is extended or adjusted under 35 U.S.C. 154(b) by 0 days.

(21) Appl. No.: 15/984,710

(22) Filed: May 21, 2018

(65) Prior Publication Data

US 2018/0264747 A1    Sep. 20, 2018

Related U.S. Application Data

(62) Division of application No. 14/481,551, filed on Sep. 9, 2014, now Pat. No. 9,975,293, which is a division
(Continued)

(51) Int. Cl.
*B29C 65/20* (2006.01)
*B29C 65/00* (2006.01)
(Continued)

(52) U.S. Cl.
CPC ............ *B29C 66/435* (2013.01); *B29C 65/02* (2013.01); *B29C 65/20* (2013.01);
(Continued)

(58) Field of Classification Search
CPC ................ B29C 66/8362; B29C 65/2061
See application file for complete search history.

(56) References Cited

U.S. PATENT DOCUMENTS 2,387,566 A    10/1945 Custers
3,252,155 A    5/1966 Surtees et al.
(Continued)

FOREIGN PATENT DOCUMENTS

EP    0449182 A2    10/1992
EP    0 584 469 A1    3/1994
(Continued)

OTHER PUBLICATIONS

International Search Report and Written Opinion dated May 14, 2014.
(Continued)

*Primary Examiner* — Scott W Dodds
(74) *Attorney, Agent, or Firm* — Wood, Phillips, Katz, Clark & Mortimer

(57) ABSTRACT

A method for forming a geomembrane liner testable for leaks by securing adjacent panels together with the conductivity of the lower surface of an overlying panel broken along a line adjacent the panel overlapping edge, and the overlapping edges sealed along the line. A heat welder has slots for the overlapping panel edges, with a heated wedge between the slots and having a projection to break the conductivity of the overlying panel bottom surface as it passes the wedge. The slots merge to press the liner edges together to heat weld them along the line of broken conductivity as the welder is moved along the panel edges.

11 Claims, 6 Drawing Sheets

Related U.S. Application Data of application No. 13/764,305, filed on Feb. 11, 2013, now Pat. No. 9,033,620.

(51) Int. Cl.
| | |
|---|---|
| *G01M 3/40* | (2006.01) |
| *E02B 3/12* | (2006.01) |
| *B29C 65/02* | (2006.01) |
| *B29C 65/78* | (2006.01) |
| *E02D 31/00* | (2006.01) |
| *B29C 65/74* | (2006.01) |
| *B29C 65/82* | (2006.01) |
| *E02B 5/02* | (2006.01) |
| *E02B 3/10* | (2006.01) |
| *B29L 7/00* | (2006.01) |

(52) U.S. Cl.
CPC ...... *B29C 65/7439* (2013.01); *B29C 65/7861* (2013.01); *B29C 65/8246* (2013.01); *B29C 65/8276* (2013.01); *B29C 66/02241* (2013.01); *B29C 66/1122* (2013.01); *B29C 66/232* (2013.01); *B29C 66/304* (2013.01); *B29C 66/43* (2013.01); *B29C 66/723* (2013.01); *B29C 66/73141* (2013.01); *B29C 66/73187* (2013.01); *B29C 66/8167* (2013.01); *B29C 66/8221* (2013.01); *B29C 66/8362* (2013.01); *B29C 66/86523* (2013.01); *E02B 3/121* (2013.01); *E02D 31/004* (2013.01); *G01M 3/40* (2013.01); *B29C 66/71* (2013.01); *B29C 66/81417* (2013.01); *B29C 66/81422* (2013.01); *B29C 66/81427* (2013.01); *B29C 66/8324* (2013.01); *B29C 66/843* (2013.01); *B29C 66/8432* (2013.01); *B29C 2793/0054* (2013.01); *B29L 2007/005* (2013.01); *E02B 3/10* (2013.01); *E02B 5/02* (2013.01); *Y10T 156/10* (2015.01); *Y10T 156/1715* (2015.01)

(56) References Cited

U.S. PATENT DOCUMENTS

| | | | |
|---|---|---|---|
| 3,934,322 | A | 1/1976 | Ford et al. |
| 3,943,273 | A | 3/1976 | de Putter |
| 4,404,857 | A | 9/1983 | Hardison et al. |
| 4,764,328 | A | 8/1988 | Matz et al. |
| 4,894,112 | A | 1/1990 | Lippman |
| 4,960,478 | A | 10/1990 | Newkirk et al. |
| 5,288,168 | A | 2/1994 | Spencer |
| 5,407,514 | A | 4/1995 | Butts et al. |
| 5,490,626 | A | 2/1996 | Kaminski |
| 5,850,144 | A | 12/1998 | Howells et al. |
| 6,378,589 | B1 | 4/2002 | Struve |
| 6,390,168 | B1 | 5/2002 | Struve |
| 8,230,892 | B1 | 7/2012 | George et al. |
| 2003/0032046 | A1 | 2/2003 | Duffy et al. |
| 2009/0314767 | A1 | 12/2009 | Chen et al. |

FOREIGN PATENT DOCUMENTS

| | | |
|---|---|---|
| EP | 1057940 A1 | 12/2000 |
| JP | 3137591 B2 | 2/2001 |
| WO | 98/48207 A1 | 10/1998 |
| WO | 2005075747 A1 | 8/2005 |
| WO | 2009/007511 A1 | 1/2009 |

OTHER PUBLICATIONS

Supplementary European Search Report dated Jul. 6, 2016.
Material filed by a third party dated Feb. 22, 2017.
D2—Frobel, R.K., "Method of Constructing and Evaluating Geomembrane Seams"; International Conference on Geomembranes, Proceedings vol. II; Jun. 20-24, 1984, p. 359.
D3—Spanner, G. E.; "Nondesctructive Technique for Assessing Field Seam Quality of Prefabricated Geomembranes"; International Confrence on Geomernbranes, Proceedings vol. II; Jun. 20-24, 1984, p. 369.
D4—Gary M. Kolbasuk; "Hot Wedge Fusion Welding of HD PE Geomembranes"; The Seaming of Geosynthetics ! Structures. Foundations. Geo synthetic materials; R.M. Koener, 1990.
D5—Henry E. Haxo, Jr. & Lawrence C. Kamp; "Destructive Testing of Geomembrane Seams": The seaming of geosynthetics, 1990, p. 89.
D6—Rober E. Landreth & David A. Carson; "Technical guidance document: inspection techniques for the fabriation of geornembrane field seams"; May 1991.
D10—Scheirs, John; "A Guide to Polymeric Geomembranes"; Wiley, 2009, p. 427.
D11—"NSF Standard 54—Flexible Membrane Liners"; 1991.
D12—"GRI Test Method GM13, Test Methods, Test Properties and Testing Frequency for High Density Polyethylene (HOPE) Smooth and Textured Geomembranes"; Geosynthetic Institute, 2012, p. 7.
D13—Christensen T.H.; "Landfilling of Waste: Barriers"; 1994, p. 442.
D15—Peggs, Ian; "Evaluation of Seam Quality in Textured Geomembrane with Extensively Rippled"; Aug. 1, 2002.
D16—ASTM D7240; "Standard Practice for Leak Location using Geomembranes with an Insulating Layer in Intimate Contact with a Conductive Layer via Electrical Capacitance Technique (Conductive Geomembrane Spark Test)"; 2011.
D17—ASTM D7002; "Standard Practice for Electrical Leak Location on Exposed eomembranes Using the Water Puddle Method"; Dec. 2003.

METHOD AND APPARATUS FOR FORMING LEAK DETECTABLE GEOMEMBRANE LINERS

CROSS-REFERENCE TO RELATED APPLICATIONS

This application is a divisional application of U.S. Pat. No. 9,033,620, issued May 19, 2015, entitled "Leak Detectable Geomembrane Liners for Containment System and Method of Testing for Leaks", and Ser. No. 14/481,551, filed Sep. 9, 2014, entitled "Method and Apparatus for Forming Leak Detectable Geomembrane Liners", the disclosures of which are hereby incorporated by reference.

FEDERALLY SPONSORED RESEARCH OR DEVELOPMENT

Not Applicable.

MICROFICHE/COPYRIGHT REFERENCE

Not Applicable,

FIELD OF THE INVENTION

The present invention relates to combining geomembrane liner panels to form geomembrane liners, and more specifically to a method and apparatus for sealing geomembrane panels together to form liners facilitating detection of leaks therein.

BACKGROUND OF THE INVENTION

Lining systems for containment systems (e.g., systems which contain bodies of water such as ponds) and the like are used to provide an "impermeable" barrier between contaminants and the underlying ground. Generally, these liners are made of insulating material (such as high density polyethylene) which, even if thoroughly tested to be defect free when shipped, can be damaged during shipping and/or installation by, for example, heavy equipment, cutting tools, welding equipment, animals, and vandalism, necessitating that a final leak check be conducted after the liner is installed to locate leaks caused by any such damage. The liner can also be damaged after it is covered by soil and/or liquid, including during its service life as a result, for example, of stones, rocks and/or settlement. Detecting such leaks is important, particularly where hazardous materials are involved, as holes as small as 1.0 millimeter in diameter may cause leaks on the order of a couple of gallons per day with one foot of water pressure.

Electrical leak location has heretofore been used which involves placing an electrical potential across a geomembrane and then locate the points of anomalous potential distribution where, electrical current flows through leaks in the geomembrane. The electrical potential is typically applied utilizing a power supply with the positive electrode submerged in water or a soil layer above the geomembrane, and the negative electrode connected to the soil layer below. When there are leaks, electrical current flows through the leaks, which produces high current density and a localized anomaly in the potential distribution in the material above the geomembrane. Electrical measurements are made to locate those areas of anomalous signal at the leaks, ASTM D7002 and D7007, for example, include details pertaining to such tests. Such measurements have been made using a dipole or pole measurement configuration (though various types of data acquisition equipment can be used), with point by point measurements commonly made using either dipole or pole measurements along parallel lines on a grid pattern.

In one such method of electrically detecting liner leaks, for example, a potential is induced across the thickness of a liner. If a potential of one polarity is induced on one side of the sheet and a potential of the opposite polarity is induced on the opposite side of the sheet, the resulting electrical field will be affected if there is any conductivity from side to side across the sheet, with the effects on the conduction monitored to detect the presence of a leak. Such a detecting method requires an electrically conductive media both above and below the liner, which can be provided by liquid or soil above the liner and good electrical contact with a conductive underlying soil.

However, in some installations, electrically detecting leaks in the above described manner is unreliable. For example, if the liner is not maintained in good electrical contact with the earth (due to, e.g., use of double liners or other insulating materials, irregularities in the subgrade, and/or wrinkles in the liner) and/or the earth under the geomembrane is dry or not conductive or highly resistant (e.g., in a landfill or with a mining heap leach pad, secondary containment, or coal ash containment), reliable measurements of potential may not be obtained. Similarly, in some landfills, there is leak detection layer of either sand, gravel or geosynthetic product directly underneath the geomembrane for draining any leakage through the geomembrane to a detection site, which layer can inhibit or nullify the leak location survey due to the lack of conductivity of the material.

One solution to this unreliability arising from possibly insufficient electrical conductivity on the underside of the liner was suggested in U.S. Pat. No. 3,252,155, which disclosed placing the liner over or even adhesively secured to a metal foil sheet, where the foil would provide the required underlying conductivity. That technique was not widely accepted in the industry, however, as such foil is expensive, securing the metal foil to the liner, whether adhesively or mechanically, is extremely difficult to achieve, and the exposed metal foil could severely degrade as a result of, for example, galvanic corrosion, at the construction site.

Spencer U.S. Pat. No. 5,288,168 (the full disclosure of which is hereby incorporated by reference) has significantly improved upon the foil sheet suggestion by disclosing a liner having an electrically conductive layer provided by embedding conductive particles in the bottom of the layer. The integrity of the sheet is then monitored by establishing an electric field across the sheet and monitoring for sparks between a probe and the bottom, conductive plastic layer. Such spark testing has been accomplished, for example, with a test device that includes a high voltage power source with the positive lead attached to a brass brush and the negative lead attached to a conductive neoprene grounding pad laid on top of the geomembrane. See, for example, ASTM 7240.

Spark testing of seams in particular has heretofore been done such as detailed in ASTM D6365, wherein conductive material is inserted into the seam just prior to or during fabrication of the seam, with the conductive material connected to a negative terminal of a test apparatus and a positive voltage applied across the seam edge such that a suspect area in the seam is indicated by a spark from the voltage source to the conductive material.

While the Spencer '168 invention significantly improved leak detection in testing panels, it should be appreciated that during construction of a lined pond, leaks may be caused in a geomembrane panel which was found by testing to have no leaks immediately after liner installation (e.g., by puncturing a liner when it is covered in place by soil and/or water). Moreover, since such lined facilities are typically constructed using a plurality of geomembrane panels heat welded together along seams, testing of the individual panels will not detect leaks at the seams of the panels, where false and anomalous readings have been found. Still further, the conductivity of individual liner panels is often still insufficient for reliable testing, particularly where the liner panel is not maintained in good electrical contact with the earth (due to, e.g., use of double liners, irregularities in the subgrade, and/or wrinkles in the liner) and/or the earth is dry or not conductive.

SUMMARY OF THE INVENTION

In one aspect of the present invention, a method is provided for forming a geomembrane liner testable for leaks. The method includes the steps of providing a plurality of geomembrane panels having conductive lower surfaces, and securing adjacent panels together, wherein the conductivity of the lower surface of an overlying panel is broken along a line adjacent the panel overlapping edge, and the overlapping edges are sealed along the conductivity broken first line.

In one form of this aspect of the invention, the conductivity along the first line is broken as the overlapping edges are positioned and sealed.

In another form of this aspect of the invention, the conductivity is broken along the line while heating the lower surface of one panel, and the securing step presses the heated lower surface against the underlying edge of the other adjacent panel.

In still another form of this aspect of the invention, the conductivity of the lower surface of the one panel is broken along a second line adjacent the first line, and the securing step further comprises sealing the one panel overlapping edge along the conductivity broken second line to the underlying edge of the other of the adjacent panels.

In another aspect of the present invention, a method is provided for sealing a plurality of geomembrane panels together along adjacent edges, with at least one of the panels having a conductive lower surface for testing the sealed panels for leaks. The method includes (a) laying one of the panels on a surface, (b) breaking the conductivity of the first panel bottom surface across a first line adjacent the side of the second panel, and sealing the bottom surface of the first panel along the first line to the adjacent panel.

In one form of this aspect of the invention, the sealing step further includes heating the bottom surface of the first panel along the first line; and pressing the first and second panels together along the first line to heat seal the bottom of the first panel on top of the second panel.

In another form of this aspect of the invention, the heating step includes sliding the bottom of the first panel against a heated element along the first line, and the heated element includes a raised projection which interrupts the conductive lower surface of the first panel.

In still another form of this aspect of the invention, the breaking step further breaks the conductivity of the first panel bottom surface along a second line adjacent the first line, and the sealing step seals the bottom surface of the first panel along the second line to the second one of the panels.

In yet another form of this aspect of the invention, the providing step provides panels having a non-conductive member with an integral conductive media on the lower surface of the non-conductive member.

In another aspect of the invention, a heat welder is provided for securing together overlapped edges of adjacent geomembrane liner panels having conductive bottom surfaces. A welder body defines generally horizontally oriented first and second slots with top and bottom walls extending between the welder body front and rear, wherein the first slot is open on one lateral side for receiving one of the panels and the second slot is below the first slot and open on the lateral side opposite the one side for receiving the overlapping edge of the second one of the panels, with the first and second slots merging at the body rear end. A drive moves the welder body forward. A heating unit is between the first and second slots and forward of the merged first and second slots, and defines a portion of a bottom wall of the first slot. At least one projection extends partially into the first slot for engaging the conductive bottom surface of the overlying panel to interrupt the conductive bottom surface along a line as it passes the projection. The merged first and second slots press together first and second liner panels to heat weld the first and second liner panels together along the line of the interrupted conductive bottom surface.

In one form of this aspect of the invention, the heating unit is a wedge having first and second laterally spaced sections. Each section defines a portion of a bottom wall of the first slot and a portion of a top wall of the second slot, with each section also have one of the projections. The wall defining portions of each section are tapered together at their rear ends adjacent the merged first and second slots. The merged slots are adapted to heat weld first and second liner panels together along substantially parallel lines corresponding to projection interruptions in the conductive bottom surface of the first one of the panels. In a further form, the projections extend longitudinally toward the body rear from a pointed end.

In another form of this aspect of the invention, the projection extends longitudinally toward the body rear from a pointed end.

In still another form of this aspect of the invention, the projection is associated with and heated by the heating unit.

In another aspect of the invention, a heating unit is provided for use with a heat welder for securing overlapping edges of adjacent geomembrane liner panels together. The heating unit includes a wedge between the first and second slots whereby the wedge defines a portion of an upper wall of the lower slot and a portion of the lower wall of the upper slot, and the defined upper and lower walls taper together to a merged end. At least one projection extends from the wedge defined lower wall of a welder upper upper slot sufficiently to interrupt a bottom portion of a liner panel passing over the projection while still maintaining the overall structural integrity of the panel.

In one form of this aspect of the invention, a heating element heats the wedge wall defining portions and the projection.

In another aspect of the invention, a heating unit is provided to secure overlapping edges of adjacent geomembrane liner panels together. The unit includes a heated wedge movable between overlapping edges of adjacent liner panels, with upper and lower walls tapered together at one end of the wedge. At least one projection extends from the wedge upper wall sufficiently to interrupt a bottom portion of a liner panel sliding along the wedge upper wall while still maintaining the overall structural integrity of the panel. Guides direct the overlapping edges of adjacent liner panels together at the wedge one end when the heating unit is moved between liner panel overlapping edges.

In one form of this aspect of the invention, the heating unit is adapted to heat the overlapping edges of both adjacent liner panels when the heating unit is between the adjacent liner panels.

In another form of this aspect of the invention, a heating element heats the wedge wall defining portions and the projection.

DETAILED DESCRIPTION OF THE PREFERRED EMBODIMENT

A heat welding apparatus 10 is disclosed in the Figures which may be used in accordance with the present invention to heat weld seams 14 between geomembrane panels 16, 18 (typically, rolls of plastic sheet) used to form a liner 20 for, for example, large containment areas, referred to herein generally as containment systems.

Figure 1:
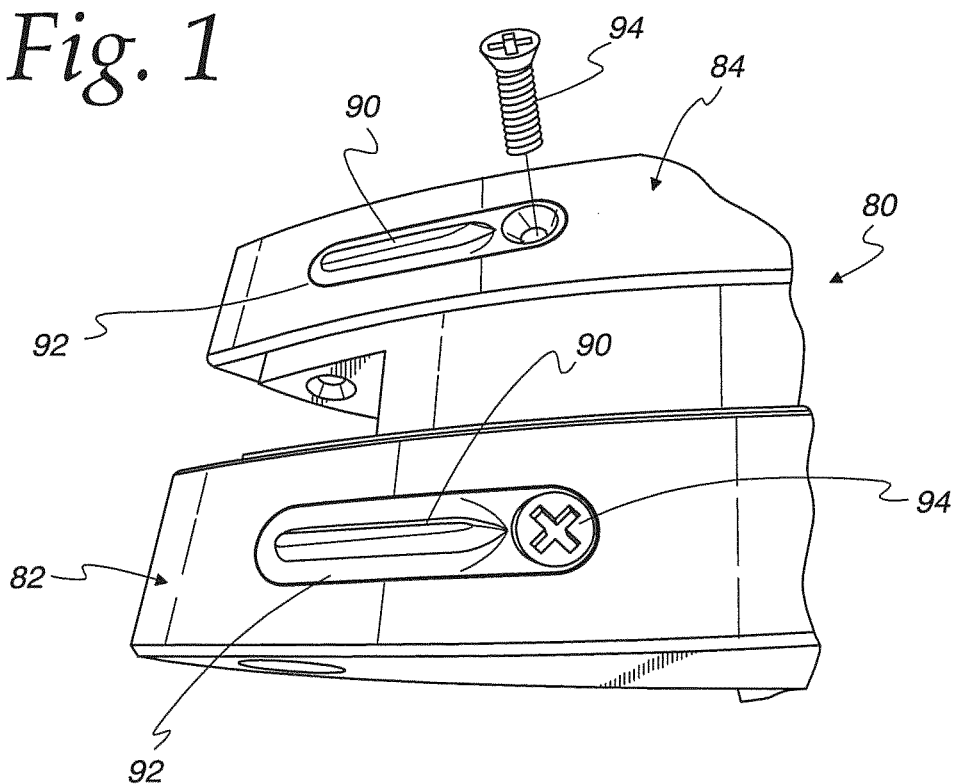
FIG. 1 is a partial perspective view of a heating element according to one aspect of the present invention.
Figure 2:
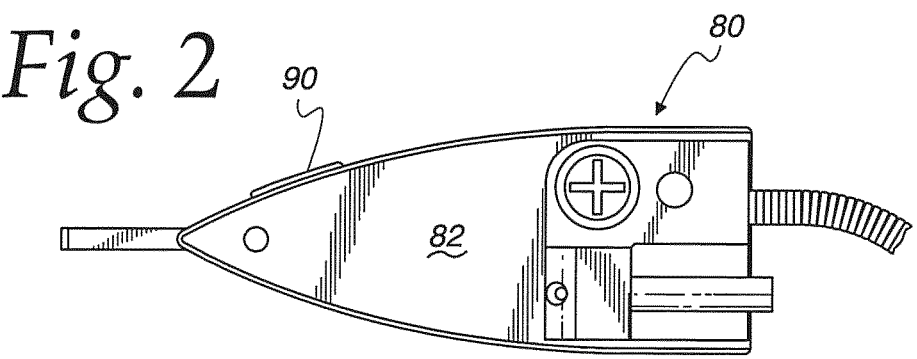
FIG. 2 is side view of the heating element of FIG. 1.
Figure 3:
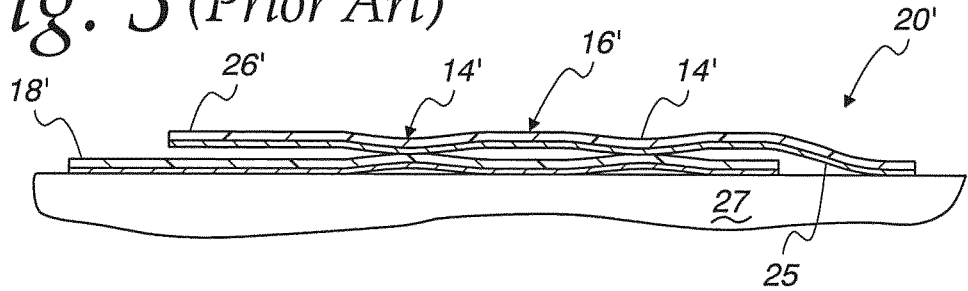
FIG. 3 is a cross-sectional view showing a seam between adjacent panels of a prior art containment system liner.

The panels 16, 18 are geomembranes formed of a suitable leak proof non-conductive material having a suitable integral conductive lower surface 25. The lower conductive surfaces of the individual panels 16, 18 may also be interconnected with a series of conductive geomembranes, wires, or other conductive media in a grid pattern, or other materials suitable for connecting individual panels. Moreover, in accordance with the present invention, the formed seams 14 between panels 16, 18 maybe be suitably tested for leaks even after covered with, for example, water and/or soil, allowing performance of a reliable leak location survey In particular, in accordance with one aspect of the present invention, seams 14 may be easily formed so as to avoid the anomalies found in testing liner seams heretofore. Specifically, as illustrated in FIG. 3, the geomembrane panels 16', 18' have heretofore been connected in prior art liners 20' by overlapping two edges of the panels 16', 18' and then heat welding the overlapping edges together along a seam 14'. Even where two such seams 14' are formed as illustrated to help to guard against leaks between the overlapping edges, the conductive lower surface 25 of the seam flap 26' of the top panel 16' will carry current from above the liner 20' through the seams 14' to the bottom of the liner 20' (i.e., at the right side of FIG. 3) where it is in contact with the underlying ground 27. Such conductivity through the seams 14' provides a false identification of a leak in the liner 20' along the seam 14'. Moreover, ignoring such current flow as being anomalous (or as indicating a leak through the seam(s) 14') could cause actual leaks through the bottom panel 18' near the flap 26' of the overlying edge of the top panel 16' to be overlooked.

Figure 6:
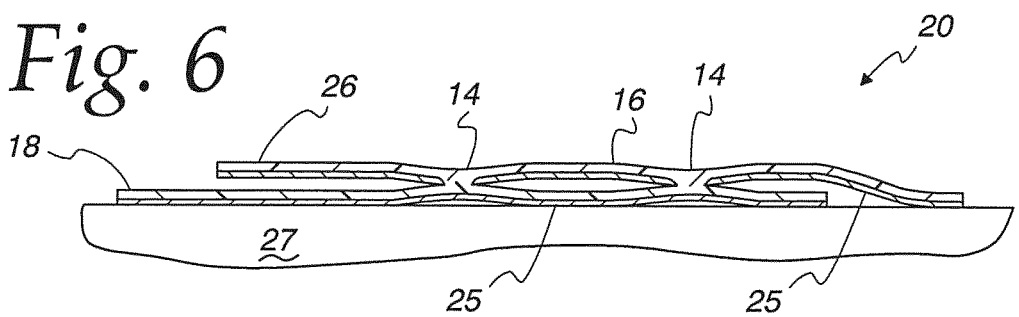
FIG. 6 is a cross-sectional view showing a seam between adjacent panels of a containment system liner formed according to the present invention.
Figure 7:
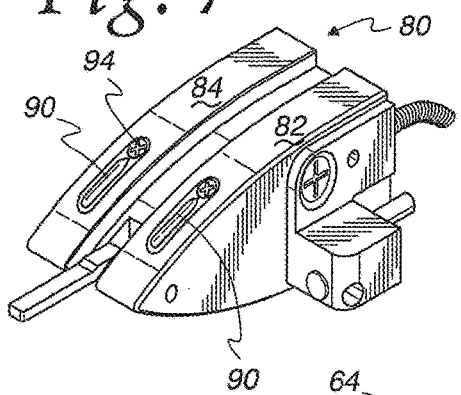
FIG. 7 is a perspective view of the heating element of FIG. 1.
Figure 8:
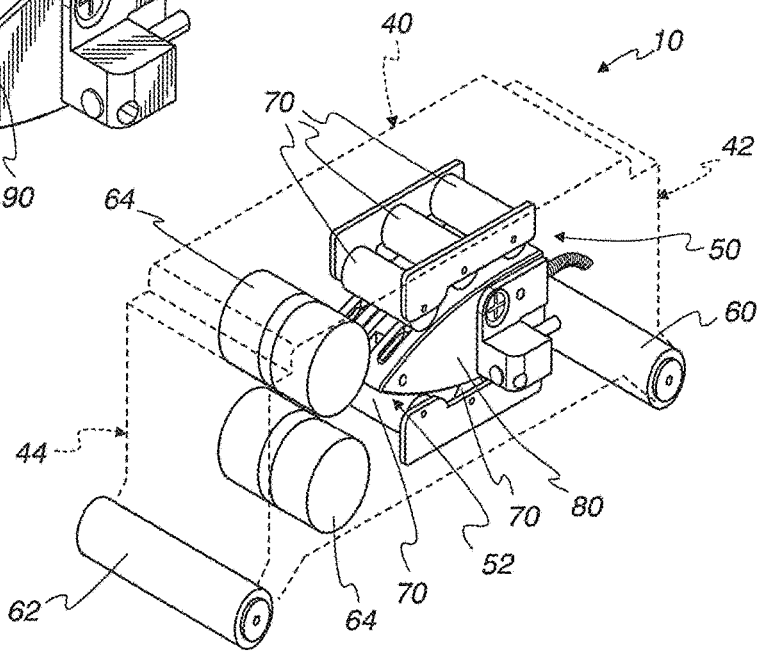
FIG. 8 is a perspective view of the heat welder of FIG. 4 with the housing broken away for clarity.
Figure 9:
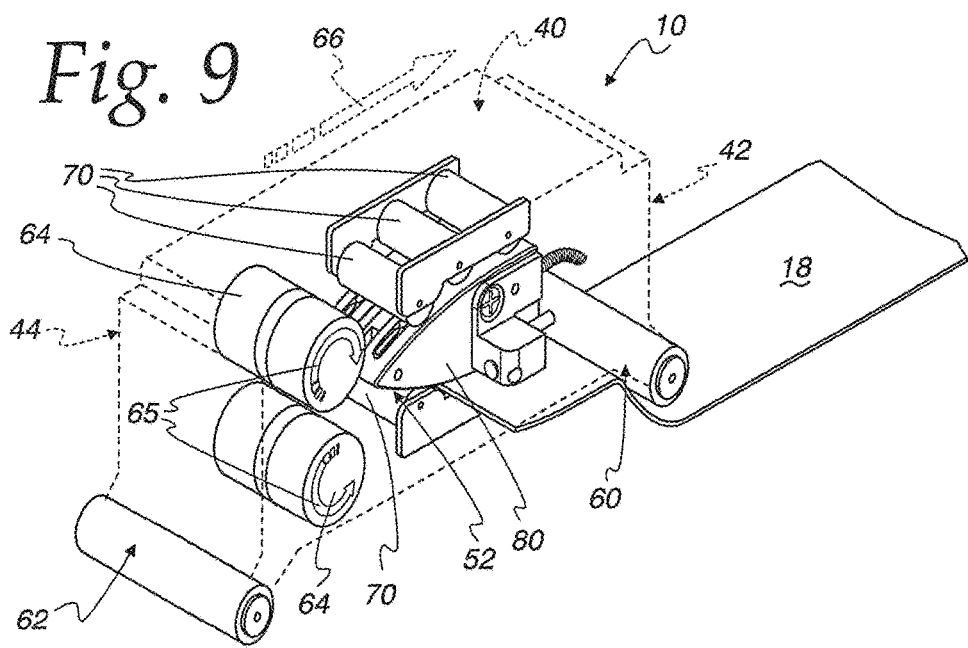
FIG. 9 is a perspective view like FIG. 8 but showing a bottom liner panel being fed into the heat welder.
Figure 10:
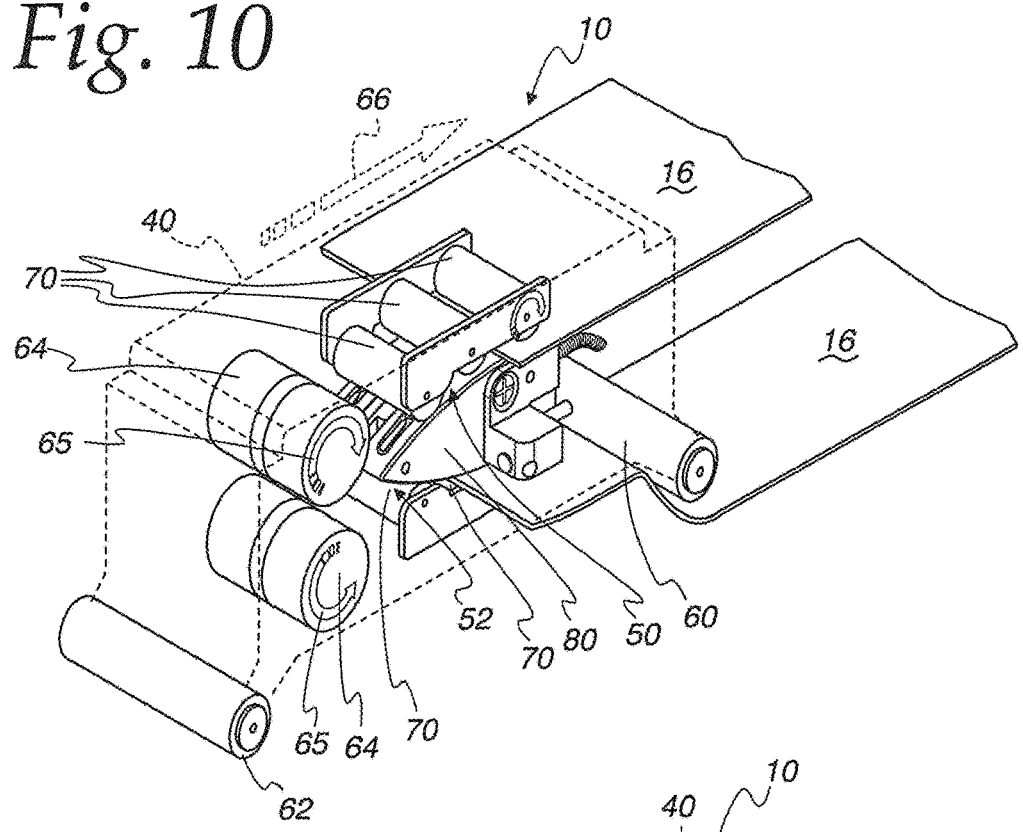
FIG. 10 is a perspective view like FIG. 8 but showing a both the top and bottom liner panels being fed into the heat welder.
Figure 11:
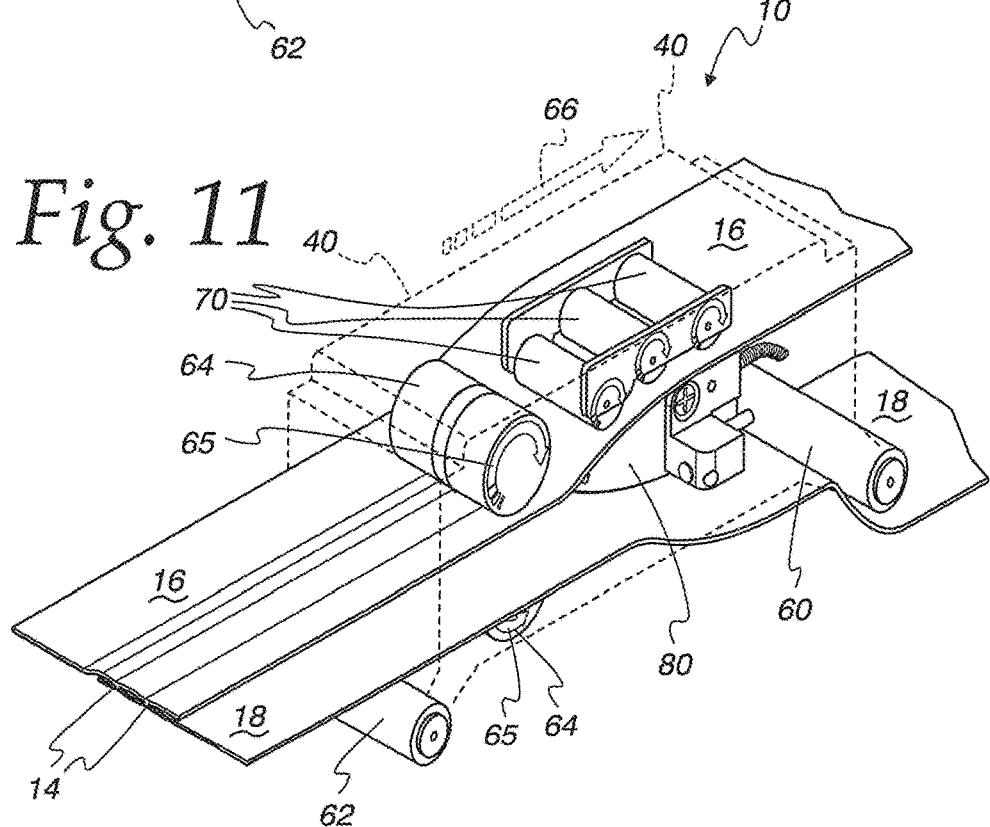
FIG. 11 is a perspective view like FIG. 8 but both liner panels continuing to be fed into the heat welder with a the panels passing out the rear of the welder having two seams formed therein according to the present invention.

In accordance with the present invention, the seam(s) 14 between adjacent panels may be advantageously heat welded continuously along the length of the overlapping edges of adjacent panels 16, 18 wherein the conductive layer 25 on the bottom of the top panel 16 is interrupted along the parallel lines of the seam(s) 14 during the heat welding process (see FIG. 6). As a result, the seam(s) 14 between adjacent panels 16, 18 will not allow electric current to flow between the top and bottom of the system through the liner seam(s), and thus reliable leak test readings may be obtained even at the seam(s) 14.

The heat welding apparatus 10 and formation of the seams 14 will now be described.

Figure 4:
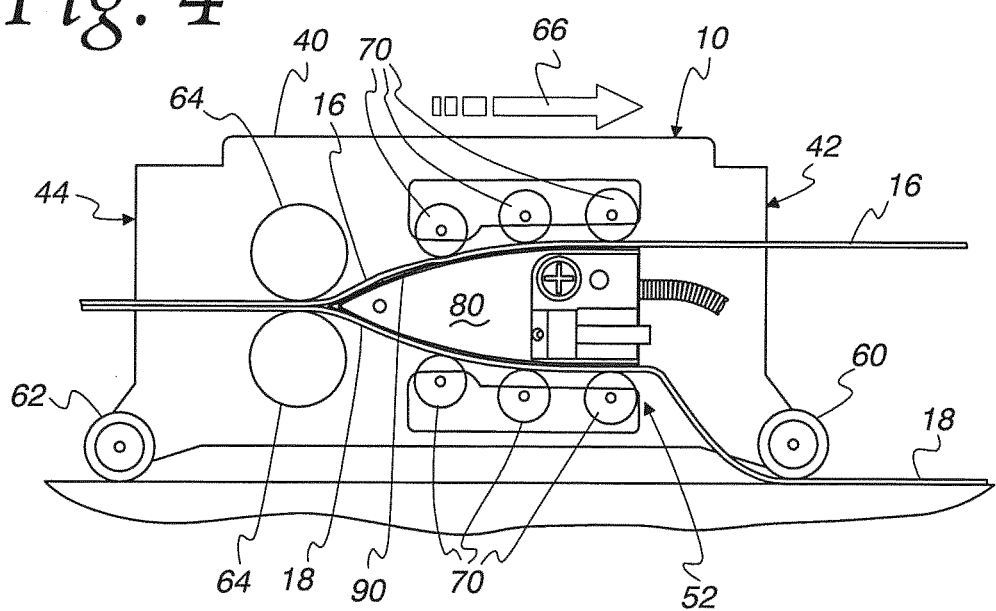
FIG. 4 is a side diagram view of a heat welder according to the present invention, having the heating element of FIG. 1.

Specifically, a heat welding apparatus 10 which may be advantageously used in connection with the present invention includes a body 40 having front and rear ends 42, 44. As best seen in FIG. 4, the body 40 defines top and bottom slots 50, 52 extending between the front and rear ends 42, 44, each slot 50, 52 being generally horizontally oriented and arranged to accept the overlapping edges of adjacent panels 16, 18.

Figure 5:
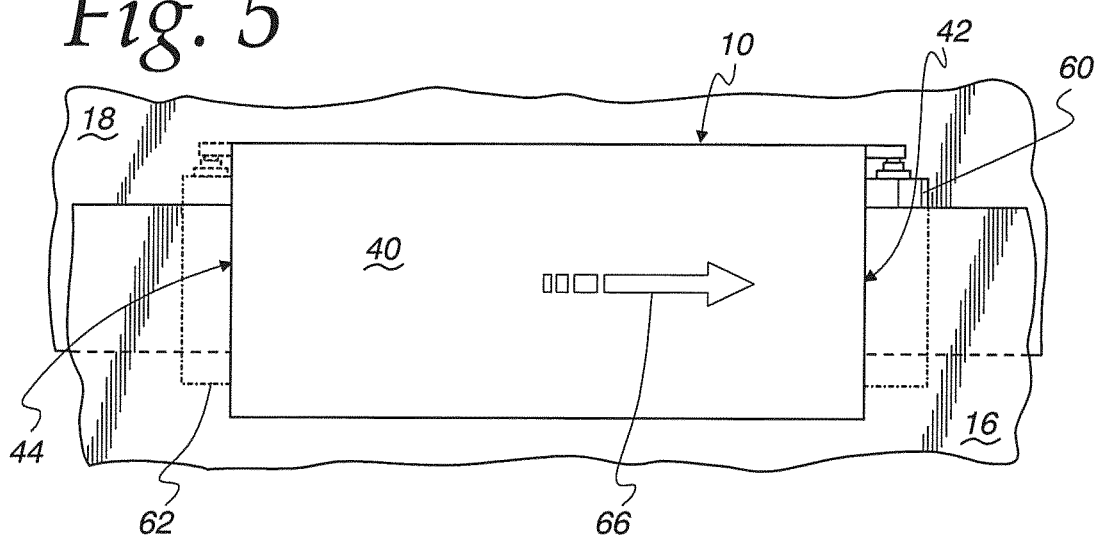
FIG. 5 is a top view of the heat welder of FIG. 4 shown welding adjacent geomembrane panels.
Figure 14:
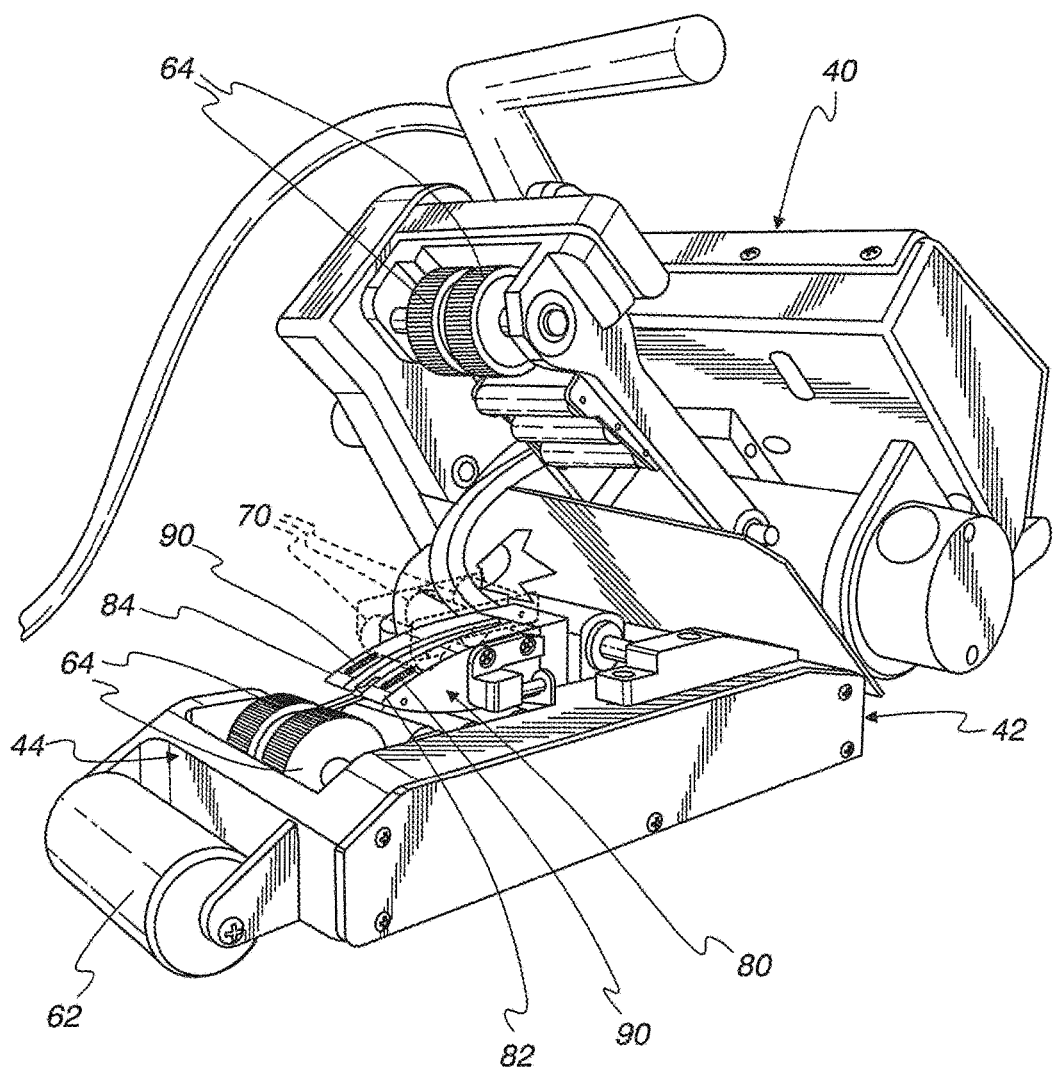

As best understood from FIGS. 4, 5 and 14, the slots 50, 52 of the apparatus (heat welder) 10 are also open on opposite lateral sides of the body 40, so that the welder 10 may be oriented so that it too overlaps with the overlapping edges of the panels 16, 18. The apparatus is suitably supported by front and rear wheels 60, 62 so that it may move relative to the panels 16, 18 and may be suitably driven by nip rollers 64 (as indicated by the arrows 65) to pull the heat welder 10 along the panels 16, 18 in the direction of arrow 66.

It should be understood that while the apparatus slots 50, 52 may be described as extending horizontally, such horizontal orientation refers to the slots 50, 52 extending generally from the front to rear ends 42, 44, with the slots 50, 52 providing a non-planar path which merges together at the rear end 44 of the apparatus 10.

Moreover, it should be understood that while the slots 50, 52 may be described as having top and bottom walls for simplicity of description, such description encompasses guiding members 70 such as contour rollers and/or partial walls. As such, "slots" as described generally herein would encompass any structure in which the edges of the panels 16,

18 may be moved through the apparatus while maintaining their generally horizontal orientation without buckling or folding.

The welder 10 includes a heating unit 80 between the slots 50, 52 and forward of the merger of the slots 50, 52 at the apparatus rear end 44. Advantageously, the heating unit 80 defines a portion of a bottom wall of the top slot 50 and a portion of the top wall of the bottom slot 52 and is wedge shaped so as to be tapered together at its rear end. The heating unit 80 is suitably heated so that the panels 16, 18 which pass over the heating unit 80 have their faces heated sufficiently so that when the panels 16, 18 are pressed together in the merged path at the apparatus rear end 44, they are heat welded.

As illustrated, the heating unit 80 includes two laterally spaced heating sections 82, 84, for forming a seal having two parallel seams 14, though it should be understood that it would be within the scope of the present invention to provide a single heat welded seam, or more than two seams if desired.

Moreover, in accordance with the present invention, at least one heating section 82, 84 of the heating unit 80 also includes at least one projection or fin 90 extending partially into the top slot 50 from below.

The fin 90 may advantageously be of any shape suitable to melt through the conductive thin layer on the bottom surface 25 of overlapping edge of the top panel 16 as it passes through the slot 50 and past the projection 90. Moreover, while the fin 90 may advantageously be shaped as illustrated, with a pointed leading (forward) edge, the shape and size could vary while still providing at least some of the advantages of the present invention.

Further, the fin 90 may be an integral part of the heating unit 80, or it may advantageously be provided on an insert 92 in a recessed pocket in the heating unit 80 and removably secured therein by, for example, a countersunk screw 94. Still further, for heating units 80 such as illustrated which have more than one heating section 82, 84, it should be appreciated that a projection 90 may be provided on both sections 82, 84 to provide redundancy, although at least some of the advantages of the present invention could be provided with a projection 90 provided on only one of the sections 82, 84.

It should thus be appreciated that as the two heated panels 16, 18 are pressed together behind the heating unit 80 by the nip rollers 64, each of which have two sections aligned with the two fins 90, respectively for forming the heat welded seams 14 along the length of the panels 16, 18. The welder 10 will thus form a pair of parallel seals 14 between the overlapping adjacent panels 16, 18 wherein, as shown in FIG. 6, there is no conductive layer passing through either of the seams 14—that is, there will be no current flow through across the seams 14 such as has heretofore provided anomalous and erroneous readings when leak testing. (It should be appreciated also that it would be within the scope of the present invention to form only one such seam 14).

Yet another embodiment of the present invention allows for reliable leak testing of liners formed of a plurality of panels even when used in applications where the liner may not be not maintained in good electrical contact with the earth (due to, e.g., use of double liners, irregularities in the subgrade, and/or wrinkles in the liner) and/or the earth is dry or not sufficiently conductive.

Figure 12:
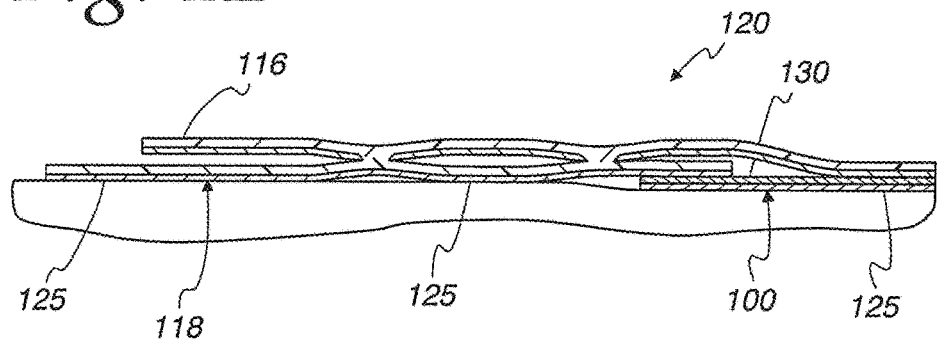
FIG. 12 is a cross-sectional view showing a seam between adjacent panels of a containment system liner formed according to another aspect of the present invention.
Figure 13:
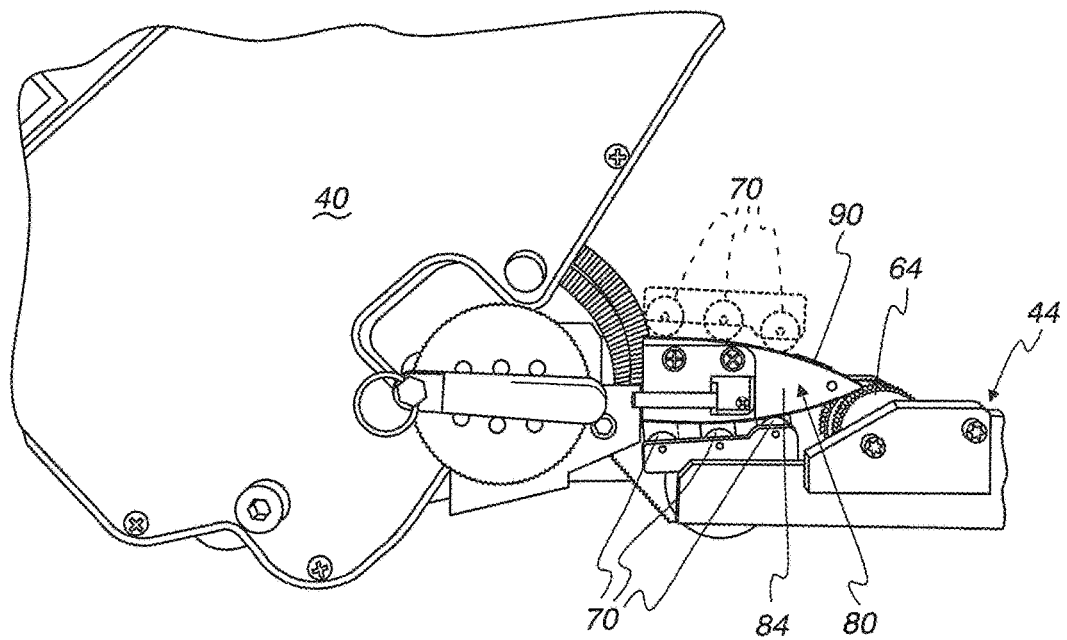
FIGS. 13 and 14 are partial and full perspective views, respectively, of a heat welder which may be used in accordance with the present invention, with the heat welder being shown in an open configuration with the contour rollers illustrated in phantom in their operative position when the welder is closed.

Specifically, as illustrated in FIG. 12, in accordance with this aspect of the invention, a conductive member 100 may be provided beneath adjacent geomembrane liner panels 116, 118 having conductive bottom surfaces 125. As illustrated in FIG. 12, the conductive member 100 is an inverted section of a geomembrane liner panel with a conductive surface on one side—laid upside down with the conductive surface 130 on top so that it contacts the conductive bottom surfaces 125 of both of the liner panels 116, 118.

While the conductive member 100 may extend continuously underneath the adjacent liner panels 116, 118, spanning across the two so as to place them in electrical contact with each other, it should be appreciated that the member 100 may also consist of spaced short sections or strips of conductive geomembranes conductively connecting the adjacent panels 116, 118 at spaced locations along the seam(s). In fact, it should be appreciated that virtually any conductive member 100 could be used, including a grid of spaced wires or other conductive media laid beneath the liner, so long as it allows for the individual panels to effectively provide a single conductive bottom surface across the plurality of panels defining the liner 120.

It should be appreciated that while FIG. 12 illustrates this aspect of the invention with a seam incorporating the first aspect of the invention (La, with the conductive bottom surface 25 of the top liner panel 16 broken), the advantages of this second aspect of the invention (i.e., a conductive interconnection of the bottom surfaces of adjacent liner panels) could be provided with even prior art seams such as illustrated in FIG. 3. However, the full advantages of both aspects of the invention may be provided by the configuration illustrated in FIG. 12.

As previously noted, leak detection sensitivity depends on the conductivity of the materials above and below the geomembrane. As also previously noted, standard leak detection tests may use either water or moisture in the soil to transmit voltage above the geomembrane, and standard testing may utilize water or moisture in the soil below the liner for a grounding source. If there is a hole in the geomembrane then the voltage introduced in the above material will flow through the hole and to the grounding source underneath the geomembrane creating a current for leak detections. However, as also previously noted, where the material underneath the geomembrane does not have enough (or consistent) moisture to provide a suitable grounding source, such leak location testing could not heretofore be suitably performed.

With a liner 120 formed according to this aspect of the invention, leak surveys can be accomplish with direct connection to a minimum number of panels (i.e., any one of interconnected panels). The bottom conductive surfaces 125 of the electrically interconnected geomembrane panels (e.g., 116, 118) provide a single grounding source underneath the liner 120 to allow the leak location survey to be performed over entire geomembrane surface. Since the conductive layer (bottom surfaces 125 and conductive member 100) is always in intimate contact with the geomembrane panels 116, 118, and the conductivity is consistent regardless of the conductivity of the underlying layers, leak surveys can be more effectively performed when the conductive layer is utilized.

It should also be appreciated that leak detection of liners 20 formed of a plurality of panels 16, 18 according to the present invention may be performed using a variety of leak testing methods, including spark testing according to ASTM 7240. Moreover, leak detection of the seams of liners 20 formed according to the present invention could also be accomplished by spark testing according to ASTM 6365, with conductive material inserted into the seal (e.g., between the seams 14) and spark testing performed in the area of the seams 14.

It should thus be appreciated that the present invention as disclosed herein allows for containment system liners to be more easily, economically and reliably inspected using an electrical inspection apparatus to detect leaks. Such inspections can be made without the need for maintaining good electrical contact with conductive natural surroundings outside the liner. Furthermore, other objects, features and advantages of the invention will become apparent from a review of the entire specification including any appended claims and drawings.

It should be appreciated that the invention may include any or all of the above-described features, include only one of the above features, more than one of the above features, and any combination of the above features. Moreover, it should be appreciated that such features may be achieved by use of fewer than all of the above-described structural elements, including combinations less than all of the above-described structural elements.

The invention claimed is:

1. A heat welder for securing edges of adjacent geomembrane liner panels together, said geomembrane liner panels having conductive bottom surfaces and being overlapped along their edges with a first one of said panels on top of a second one of said panels, said welder comprising:
   a welder body having forward and rear ends and defining horizontally oriented first and second slots with top and bottom walls extending between the welder body front and rear, wherein
      the first slot is open on one lateral side for receiving the first one of said panels,
      the second slot is below said first slot and open on the lateral side opposite the one lateral side for receiving the overlapping edge of the second one of said panels, and
      said first and second slots merge at the body rear end;
   a drive for moving the welder body forward;
   a heating unit between said first and second slots and forward of said merged first and second slots, said heating unit defining a portion of a bottom wall of the first slot; and
   at least one projection in the form of a fin extending partially into said first slot from said define bottom wall portion of said first slot, said at least one projection engaging the conductive bottom surface of the first one of said panels to interrupt the conductive bottom surface along a line as it passes the projection;
      wherein
         said merged first and second slots press together first and second liner panels to heat weld the first and second liner panels together along the line of the interrupted conductive bottom surface,
         said at least one projection in the form of a fin extends vertically upwardly from the defined bottom wall portion of said first slot, and
         said heating unit heats the defined portion of the bottom wall of the first slot and the at least one projection.

2. The heat welder of claim 1, wherein said at least one projection interrupts the conductive bottom surface of the first one of said panels along said line by melting through said conductive bottom surface of the first one of said panels.

3. The heat welder of claim 1, wherein:
   said heating unit is a wedge having first and second laterally spaced sections, with each section defining a portion of a bottom wall of the first slot and a portion of a top wall of the second slot, having said wall defining portions tapered together at their rear ends adjacent the merged first and second slots, and
   including one of said projections; and
   said merged slots are adapted to heat weld first and second liner panels together along substantially parallel lines corresponding to projection interruptions in the conductive bottom surface of the first one of said panels.

4. The heat welder of claim 1, wherein said projections extend longitudinally toward the body rear from a pointed end.

5. The heat welder of claim 1 wherein said heating unit is a wedge between said first and second slots whereby said wedge
   defines part of an upper wall of the lower slot and the lower wall of the upper slot, and
   said defined upper and lower walls taper together to a point adjacent the merged slot; and
   said at least one projection extends from the wedge defined lower wall of the upper slot sufficiently to interrupt a bottom portion of a liner panel passing through the upper slot over the projection while still maintaining the overall structural integrity of the panel.

6. The heat welder of claim 5, further comprising a heating element for heating the wedge wall defining portions and the projection.

7. A heat welder for securing edges of adjacent geomembrane liner panels together, said geomembrane liner panels having conductive bottom surfaces and being overlapped along their edges with a first one of said panels on top of a second one of said panels, said welder comprising:
   a welder body having forward and rear ends and defining horizontally oriented first and second slots with top and bottom walls extending between the welder body front and rear, wherein
      the first slot is open on one lateral side for receiving the first one of said panels,
      the second slot is below said first slot and open on the lateral side opposite the one lateral side for receiving the overlapping edge of the second one of said panels, and
      said first and second slots merge at the body rear end;
   a drive for moving the welder body forward;
   a heating unit between said first and second slots and forward of said merged first and second slots, said heating unit defining a portion of a bottom wall of the first slot; and
   at least one projection in the form of a fin extending partially into said first slot from said defined bottom wall portion of said first slot, said at least one projection engaging the conductive bottom surface of the first one of said panels to melt through the conductive bottom surface along a line as it passes the projection;
      wherein
         said merged first and second slots press together first and second liner panels to heat weld the first and second liner panels together along the line of the melted conductive bottom surface,
         said at least one projection in the form of a fin extends in the direction of the line of the interrupted conductive bottom surface, and
         said heating unit heats the defined portion of the bottom all of the first slot and the at least one projection.

8. The heat welder of claim 7, wherein:
   said heating unit is a wedge having first and second laterally spaced sections, with each section defining a portion of a bottom wall of the first slot and a portion of a top wall of the second slot, having said wall defining portions tapered together at their rear ends adjacent the merged first and second slots, and including one of said projections; and said merged slots are adapted to heat weld first and second liner panels together along substantially parallel lines corresponding to projection interruptions in the conductive bottom surface of the first one of said panels.

9. The heat welder of claim 7, wherein said projections extend longitudinally toward the body rear from a pointed end.

10. The heat welder of claim 7 wherein said heating unit is a wedge between said first and second slots whereby said wedge defines part of an upper wall of the lower slot and the lower wall of the upper slot, and said defined upper and lower walls taper together to a point adjacent the merged slot; and said at least one projection extends from the wedge defined lower wall of the upper slot sufficiently to interrupt a bottom portion of a liner panel passing through the upper slot over the projection while still maintaining the overall structural integrity of the panel.

11. The heat welder of claim 10, further comprising a heating element for heating the wedge wall defining portions and the projection.

* * * * *